United States Patent [19]

Radcliffe, Jr.

[11] 4,008,457
[45] Feb. 15, 1977

[54] PRESSURE TRANSDUCING APPARATUS FOR USE IN A SIGNATURE IDENTIFICATION SYSTEM

[75] Inventor: Arthur J. Radcliffe, Jr., Ann Arbor, Mich.

[73] Assignee: Burroughs Corporation, Detroit, Mich.

[22] Filed: Dec. 29, 1975

[21] Appl. No.: 645,271

Related U.S. Application Data

[63] Continuation-in-part of Ser. No. 525,863, Nov. 21, 1974, abandoned.

[52] U.S. Cl. .................... 340/146.3 SY; 73/432 R; 336/130
[51] Int. Cl.² .......................................... G06K 9/00
[58] Field of Search .............. 340/146.3 SY, 149 R; 346/19, 26, 111, 112; 178/18, 19; 73/432 R; 336/130; 335/222

[56] References Cited

UNITED STATES PATENTS

| 3,170,987 | 2/1965 | O'Brien ............................... 178/18 |
| 3,199,078 | 8/1965 | Gaffney, Jr. et al. ...... 340/146.3 SY |
| 3,480,911 | 11/1969 | Danna ...................... 340/146.3 SY |
| 3,618,019 | 11/1971 | Nemirovsky et al. .... 340/146.3 SY |
| 3,621,720 | 11/1971 | Clark ........................ 340/146.3 SY |
| 3,781,798 | 12/1973 | Hinks .......................... 340/146.3 R |

Primary Examiner—Leo H. Boudreau
Attorney, Agent, or Firm—Carl Fissell, Jr.; Ronald L. Taylor; Kevin R. Peterson

[57] ABSTRACT

A pressure transducing apparatus which is responsive to the pressure variations which are produced when an individual signs his signature, for generating an electrical signal representative of such characteristic pressure variations for use in a signature identification system. The apparatus employs a handwriting surface which is positioned for receiving the handwritten signature by a pair of soft rubber supports. A permanent magnetic bar is affixed to the underside of the writing surface and is vertically displaced as the pressure applied to the writing surface is varied. A magnetic sensing coil is positioned around the path of vertical displacement of the permanent magnetic bar such that an electrical current is generated in the sensing coil in response to the displacement of the permanent magnetic member so as to provide an electrical signal which is representative of the characteristic pressure variations produced when an individual writes his signature.

10 Claims, 3 Drawing Figures

U.S. Patent     Feb. 15, 1977     4,008,457
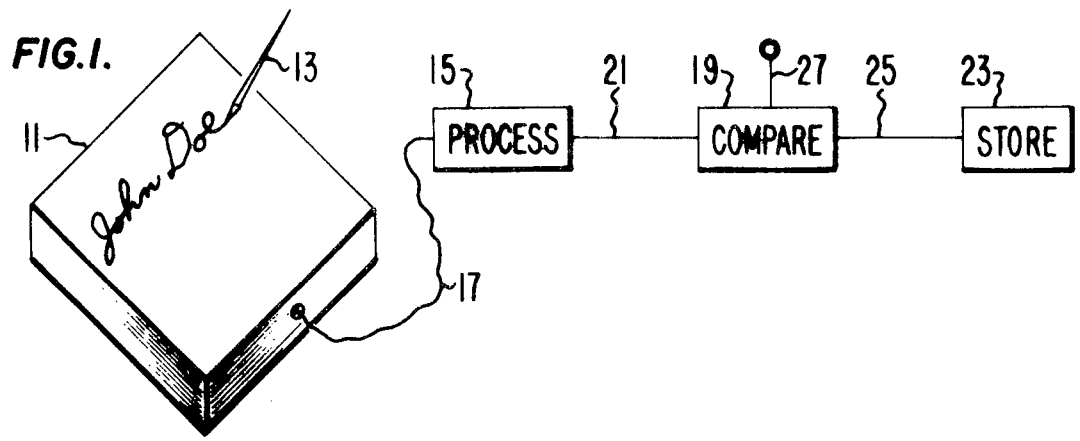
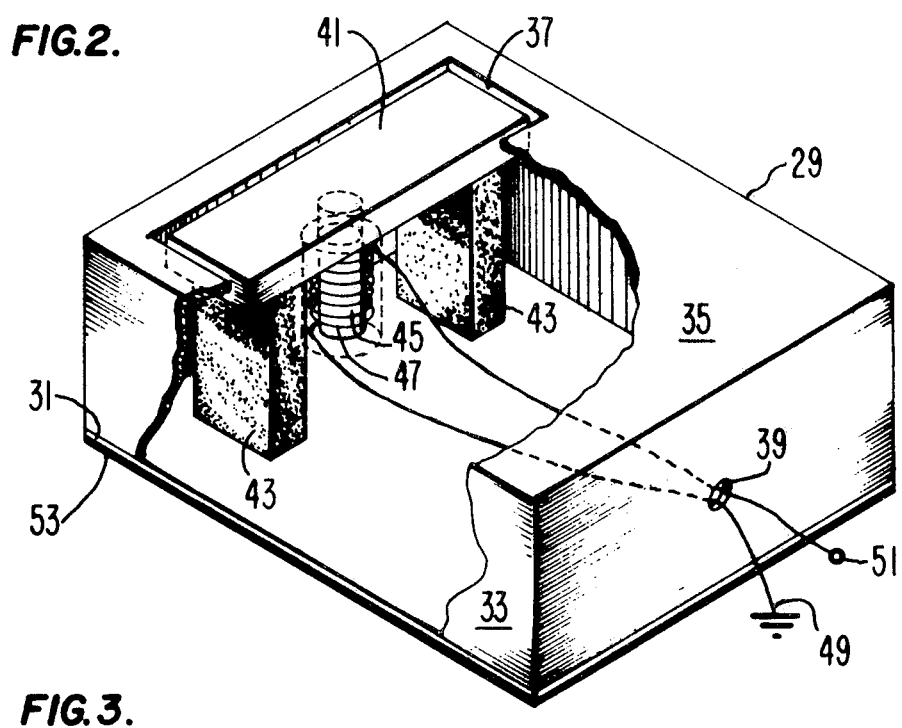
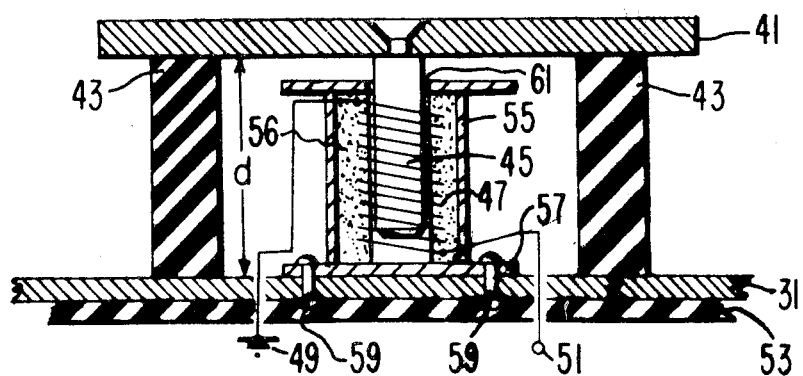

PRESSURE TRANSDUCING APPARATUS FOR USE IN A SIGNATURE IDENTIFICATION SYSTEM

CROSS REFERENCE TO A RELATED APPLICATION

This application is a continuation-in-part of application Ser. No. 525,863 filed on Nov. 21, 1974 by the present inventor, and now abandoned.

This invention also relates to and is useful in a signature identification or verification system such as disclosed in U.S. Pat. No. 3,818,443 to the present inventor entitled "Signature Verification by Zero-Crossing Characterization", and to application Ser. No. 402,723 filed Oct. 2, 1973 to the present inventor entitled "Method and Apparatus For Signal Spectrum Analysis By Hadamard Transform". This patent and patent application are assigned to the assignee of the present invention and reference is made to the following patents which are also assigned to the assignee of the present invention for a more detailed understanding of the field of use of the present invention: U.S. Pat. No. 3,528,295 to Edwin O. Roggenstein et al. entitled "Graphic Stylus"; U.S. Pat. No. 3,563,097 to Edwin O. Roggenstein et al. entitled "Conversion of Handwriting Into Electrical Signals"; and U.S. Pat. No. 3,579,186 to Robert R. Johnson et al. entitled "Personal Identification Method and Apparatus".

BACKGROUND OF THE INVENTION

The need for being able to distinguish valid signatures from those which have been forged has been well established in the fields of business and banking for quite some time. Costly experience has taught that even a careful study of an individual's signature by a merchant or a banker is not an adequate safeguard since a skilled forger can often fool anyone who is not a handwriting expert. The problem of discerning between a forged signature and a valid signature is a problem which many have attempted to solve in the prior art.

Many of the more modern attempts have recognized that an individual's signature has associated therewith several distinct characteristics which can be detected by some means or another and converted into electrical signals which can be automatically processed and compared with the stored representation of an authentic signature for determination as to whether or not the signature currently being investigated is authentic or is a forgery.

One of the characteristics of an individual's signature which has been the focus of considerably attention is the characteristic pressure which is produced when an individual signs his signature. While this type of characteristic is not discernable to one who studies the signature on a piece of paper or a document, it can be detected and stuided by other means. It has been found that the pressure variations produced when an individual signs his signature are characteristic of that individual's signatuure and can be used with an acceptable degree of accuracy for signature identification or verification purposes.

SUMMARY OF THE INVENTION

It is an object of this invention to provide a pressure transducing means for use in a signature identification or vertification system.

It is another object of the present invention to provide a means for converting the pressure variations which are produced when an individual signs his signature on a writing surface into an electrical signal representative of those pressure variations which can be processed for signature identification or verification purposes.

It is yet another object of the present invention to provide a relatively simple pressure transducing apparatus which has a compact geometrical shape which can be readily inserted into a box-like self-contained structure or into a countertop or the like for supplying electrical signals representative of the pressure variations produced when an individual writes his signature into a remote signal processing system.

It is yet a further object of the present invention to provide a pressure transducing apparatus for use in a signature verification or identification system which employs a compact geometrical structure and a minimum of expensive electronic components such as strain gauges and the like.

These and other objects and advantages of the present invention are accomplished in a pressure transducing apparatus for converting the pressure variations which are produced when an individual signs his signature on a writing surface into electrical signals representative thereof, which electrical signals may be further processed for signature identification or verification pruposes, as known in the art. The present apparatus employs a pressure responsive writing surface upon which the individual signs his signature and a pair of rubber support members to position the writing surface for receiving an individual's signature. A rod is attached to the bottom of the writing surface so as to position a length of magnetic material within an electrical coil. As pressure is exerted on the writing surface, the core member of magnetic material is vertically displaced in response to the pressure variations so as to induce an electrical current in said coil which varies in response to the pressure variations exerted on the writing surface when an individual signs his signature so as to be representative thereof. This current is then amplified and processed for signature indentification purposes as known in the art.

BRIEF DESCRIPTION OF THE DRAWINGS

Other objects, advantages and features of this invention will become more fully apparent from the following detailed description, appended claims, and accompanying drawings in which like reference numerals designate corresponding parts:

FIG. 1 shows a block diagram of a signature identification or recognition system utilizing the pressure transducing apparatus of the present invention;

FIG. 2 is a perspective view of a housing unit broken away to show the pressure transducing apparatus of the present invention; and FIG. 3 is a cutaway elevation showing in greater detail the area of the sensing coil of the pressure transducing apparatus of the present invention.

DETAILED DESCRIPTION OF THE INVENTION

FIG. 1 illustrates a signature identification or verification system wherein a pressure transducing means 11 is used to convert the variations in pressure which are produced when an individual signs his signature, as with a pen 13 or similar means, into an electrical signal which is representative of those characteristic pressure variations. This representative electrical signal is transmitted from the pressure transducing means 11 to a processing means 15 via lead 17. The processing means 15 converts the representative electrical signal into a representation of the original characteristic pressure variations which is capable of being compared with a stored representation. The comparable representation is supplied to one input of a comparator 19 via lead 21, and the other input of the comparator 19 is supplied with a pre-recorded standard or reference representation of a known signature from a memory or storage media 23 via lead 25. The comparator 19 will compare the comparable representation of the original pressure variations which wre produced when the individual whose signature is to be tested signed his signature, with the pre-recorded known representation which was stored in said storage means 23, and on the basis of this comparison a signal can be generated at the comparator output 27 to indicate whether or not a positive indentification of the original handwritten signature to be tested has been made. This signal can be used, as known in the art, to indicate that the signature being tested is valid or that the signature being tested is a forgery.

FIG. 2 illustrates the pressure transducing apparatus 11 of the present invention and shows a relatively rectangular box-like housing 29 having a rigid base member 31, sides 33, and an upper support surface 35. The upper support surface has a slot or opening 37 in the rear portion thereof and there is a small outlet hole 39 in one of the sides 33.

Positioned within the opening 37 is a writing surface or pressure plate 41 which has a relatively low inertia and a high resonant frequency. The writing surface may be, for example, a hard aluminum alloy about one inch wide by five inches long an eighth of an inch thick. The preferred aluminum alloy being made by Reynolds Aluminum, model X7016. The writing surface is damped to prevent ringing since it is supported by a pair of soft rubber support members 43 such that it is positioned within the opening 37 so that the upper surface of the writing surface 41 is flush with the top of upper support surface 35. The resiliency of the supporting members 43 is such that the writing surface 41 yields about 0.001 inches per ounce of pressure exerted on the writing surface 41. The rubber support members 43 are each constructed to have base dimensions of one inch long and a quarter inch wide, and a height dimension of an inch and a half. The preferred material for the rubber support members 43 is a silicone rubber made by Dow Corning, model 4508U.

A rod or core 45 of magnetic material is rigidly attached to the bottom of the writing surface member 41 so as to be vertically displaced with the variations in the pressure exerted on the writing surface 41. A magnetic sensing coil 47 is positioned around the core 45 such that the vertical displacements of the core 45 in the coil 47 are sensed and a electrical signal is induced in the coil, which has one end attached via lead 49 to ground and the other end serving as an electrical output terminal 51. Additionally, a block of silicone rubber 53 may be cemented to the base 31 for further serving to damp vibrations in the assembly so as to insure a truer signal with respect to the pressure applied to the writing surface 41.

FIG. 3 illustrates a cutaway view of the pressure transducing apparatus of the present invention showing in greater detail the area of the sensing coil 47 and core 45 of FIG. 2. FIG. 3 shows the writing surface member 41 securely attached to the top ends of the pair of rubber support members 43. The bottom of the rubber support members 43 is securely attached to the base 31 which has cemented thereto a block of silicone rubber 53. A spool-like structure 55 which has a flanged lip 57 at the bottom thereof is securely fastened to said base 31 via fastening means 59. The spool-like member 55 has a hollow central bore 61 into which the core member 45 is positioned. A primary winding or coil 47 is co-axially arranged with respect to the axis of the bore 61 via epoxy or filler means 56 so that the various turns of the coil surround the core 45 which is positioned in the bore of the spool-like member 55. The rod-like member 45 may have an upper portion of non-magnetic material which is secured to the underside of the writing surface 41 and a lower magnetic portion which serves as a magnetic core and is positioned within the bore 61.

The operation of the pressure transducing apparatus is such that as an individual signs his signature on the top surface of writing surface member 41, or on a paper or writing media positioned thereon, pressure variations which are characteristic of his signature, cause variations in the vertical distance "$d$" since the resilient rubber supports compress under the pressure applied to the writing surface. Variations in the distance $d$ cause variations in the vertical displacement of the core of magnetic material 45 within the co-axially arranged coil 47 and a current will be induced in the coil which is indicative of the variations in the displacement of the core. The induced current will be outputted at lead 51 and amplified by any of the means known in the art before being supplied to the processing system of block 15 of the system of FIG. 1 for signature identification purposes. The electrical signal which is present at output 51 is representative of the pressure variations which were produced when a person wrote his signature on the surface 41 since the current was produced in response to variations in the core displacement which were in turn directly porportional to the pressure exerted on the writing surface.

Although specific apparatus has been shown for the purpose of describing applicant's invention, it will be apparent to those skilled in the art that other variations and modifications in the specific structure illustrated may be made without departing from the spirit and scope of the present invention which is limited only by the appended claims.

What is claimed is:

1. A pressure transducing apparatus for converting the pressure variations produced on a writing surface when an individual signs his signature to electrical waveforms representative thereof comprising:

writing surface means for receiving the pressure exerted when an individual signs his signature;

resilient means for supporting said writing surface means and being responsive to the pressure applied thereto for yielding so as to allow said writing surface means to be vertically displaced in proportion to the variations in pressure exerted on said writing surface means when an individual signs his signature;

means for rigidly attaching a core of magnetic material to said writing surface means for vertical displacement therewith; and sensing means co-axially positioned about said core of magnetic material for generating an electrical waveform in response to the vertical displacement of said core of magnetic material, said electrical waveform being representative of the pressure variations produced on said writing surface means when an individual signs his signature thereon.

2. The pressure transducing apparatus of claim 1 wherein said sensing means comprises:

sensing housing means having a vertically oriented opening therethrough for receiving said core of magnetic material for vertical displacement therein, said sensor housing means including a sensing coil and means for coaxially arranging said sensing coil around said vertically oriented opening and along the length thereof; and means for securing said sensing housing means against motion such that the vertical displacement of said core of magnetic material wihin said opening in response to the variations in pressure exerted on said writing surface means causes said coil to generate said electrical waveform representative of said pressure variations.

3. The pressure transducing apparatus of claim 2 wherein said writing surface means includes a relatively rigid writing surface member comprising a metallic alloy having a relatively low inertia and a relatively high resonant frequency.

4. The pressure transducing apparatus of claim 3 wherein said resilient support means comprises a pair of soft rubber supports which yield approximately 0.001 inch per ounce of pressure exerted thereon for allowing the vertical displacement of said core of magnetic material and for damping said writing surface means to prevent ringing.

5. The pressure transducing apparatus of claim 4 wherein said means for mounting said sensing housing means against motion includes a base member, said base member being rigidly secured to the bottom of said vertical support means and having a layer of resilient material secured to the bottom thereof for damping vibrations in the pressure transducing apparatus for insuring a more accurate electrical waveform.

6. In a signature identification or verification system wherein an electrical signal representative of the pressure variations which are produced when an individual signs his signature are to be used for signature identification or verification purposes, said system including comparator means, means for storing a representation of an individual's known signature, means for supplying said known representation to one input of said comparator means, processing means for processing said electrical signal representative of the pressure variations which are produced when an individual signs his signature for generating a processed representation thereof, means for supplying said process representation to the other input of said comparator means, said comparator means operating to compare said stored known representation with said processed representation and having a means for indicating the existence and non-existence of a valid comparison, an improvement comprising pressure transducing means for generating said electrical signal representative of said pressure variations comprising:

platen means for providing a writing surface upon which an individual signs his signature;

resilient means for supporting said platen means and for yielding in response to the pressure exerted on said platen means when an individual signs his signature thereon for permitting said platen means to be vertically displaced in response to the pressure exerted thereon;

means rigidly attached to the underside of said platen means for positioning a core portion of magnetic material a fixed distance from the underside of said platen means for displacement therewith; and sensing means positioned about said core portion of magnetic material for sensing the displacement of said core portion of magnetic material in response to the variations in pressure exerted upon the surface of platen means (41) when an individual writes his signature thereon for generating an electrical signal representative of those variations in pressure.

7. The improved signature identification system of claim 6 wherein said sensing means comprises:

an electrical coil having one end grounded and an opposite end serving to output said electrical signal representative of said variations in pressure, and a spool-like means having a central bore therethrough for receiving said core of magnetic material and means for co-axially positioning said coil around said bore for sensing changes in the displacement of said core portion of magnetic material within said bore so as to vary the current induced in said electrical coil.

8. The improved signature identification system of claim 7 wherein said resilient support means includes a pair of rubber blocks which yield approximately 0.001 inches per ounce of pressure exerted thereon for permitting the displacement of said platen means in response to the pressure exerted thereon and for damping said platen means to prevent ringing.

9. The improved signature identification system of claim 8 wherein said platen means includes a relatively rigid member having a low inertia and a high resonant frequency for insuring the accuracy of said generated electrical signal representative of said pressure variations.

10. The improved signature identification system of claim 9 wherein said pressure transducing apparatus further includes a base means for rigidly supporting the lower end of said resilient support means and for rigidly supporting said sensing means in operable relation to said core of magnetic material, said base means including a block of rubber material cemented to the bottom thereof for damping vibrations in the pressure transducing apparatus so as to insure the generation of a more accurate electrical signal representative of the pressure variations applied to said platen means.

* * * * *